(12) United States Patent
Sato

(10) Patent No.: US 11,210,566 B2
(45) Date of Patent: Dec. 28, 2021

(54) TRAINING APPARATUS, TRAINING METHOD AND RECORDING MEDIUM

(71) Applicants: Kabushiki Kaisha Toshiba, Minato-ku (JP); Toshiba Digital Solutions Corporation, Kawasaki (JP)

(72) Inventor: Tamotsu Sato, Yokohama (JP)

(73) Assignees: Kabushiki Kaisha Toshiba, Minato-ku (JP); Toshiba Digital Solutions Corporation, Kawasaki (JP)

(*) Notice: Subject to any disclaimer, the term of this patent is extended or adjusted under 35 U.S.C. 154(b) by 96 days.

(21) Appl. No.: 16/580,014

(22) Filed: Sep. 24, 2019

(65) Prior Publication Data

US 2020/0104644 A1    Apr. 2, 2020

(30) Foreign Application Priority Data

Sep. 27, 2018   (JP) .............................. JP2018-182074

(51) Int. Cl.
G06K 9/62      (2006.01)
G06N 20/00     (2019.01)
G06N 5/04      (2006.01)

(52) U.S. Cl.
CPC ......... *G06K 9/6262* (2013.01); *G06K 9/6257* (2013.01); *G06K 9/6269* (2013.01); *G06N 5/04* (2013.01); *G06N 20/00* (2019.01)

(58) Field of Classification Search
CPC .. G06K 9/6262; G06K 9/6257; G06K 9/6269; G06K 9/6256; G06N 20/00; G06N 5/04; G06N 3/084
USPC ........................................................ 382/157
See application file for complete search history.

(56) References Cited

U.S. PATENT DOCUMENTS

| 7,693,683 B2* | 4/2010 | Ihara ................... G06F 16/2228 |
| | | 702/179 |
| 7,698,235 B2 | 4/2010 | Kuroiwa |
| 8,099,311 B2* | 1/2012 | La Vecchia .... G06Q 10/063112 |
| | | 705/7.14 |
| 9,047,562 B2* | 6/2015 | Okabe ...................... G06N 5/02 |

(Continued)

FOREIGN PATENT DOCUMENTS

JP       2005-107743 A       4/2005

OTHER PUBLICATIONS

Ho ("The Random Subspace Method for Constructing Decision Forests" IEEE Transactions on Pattern Analysis and Machine Intelligence, vol. 20, No. 8, 1998, pp. 832-844 Publication year 1998.*

*Primary Examiner* — Juan A Torres
(74) *Attorney, Agent, or Firm* — Oblon, McClelland, Maier & Neustadt, L.L.P.

(57) ABSTRACT

According to an embodiment, a training apparatus is a training apparatus training an inference model performing predetermined inference based on data, the training apparatus changes, according to a predefined distance for a selected piece of data selected based on predefined scores given to a plurality of pieces of data in a predefined classification space, the predefined score of a piece of data other than the selected piece of data, gives labels in the predefined classification space to pieces of data including the piece of data the predefined score of which is changed, builds training data from the pieces of data to which the labels are given, and updates the inference model using the training data.

6 Claims, 10 Drawing Sheets

(56) References Cited

U.S. PATENT DOCUMENTS

| | | | |
|---|---|---|---|
| 10,832,162 B2* | 11/2020 | Chen | G06N 20/00 |
| 2016/0063397 A1* | 3/2016 | Ylipaavalniemi | G06N 20/00 |
| | | | 706/12 |

* cited by examiner

| POINT | SCORE | BOUNDARY | CLASS |
|---|---|---|---|
| A | 0.6 | 1-2 | 2 | ← SELECT
| B | 0.3 | 1-3 | 1 |
| C | 0.1 | 2-3 | 3 |
| D | 0.4 | 2-3 | 2 |
| E | 0.5 | 1-2 | 1 |

SS11

↓

| POINT | SCORE | BOUNDARY | CLASS |
|---|---|---|---|
| A | 0.6 | 1-2 | 2 |
| B | 0.3 | 1-3 | 1 |
| C | 0.1 | 2-3 | 3 |
| D | −0.1 | 2-3 | 2 | ←
| E | 0.5 | 1-2 | 1 |

SS12

US 11,210,566 B2

TRAINING APPARATUS, TRAINING METHOD AND RECORDING MEDIUM

CROSS-REFERENCE TO RELATED APPLICATIONS

This application is based upon and claims the benefit of priority from the prior Japanese Patent Application No. 2018-1802074 filed in Japan on Sep. 27, 2018; the entire contents of which are incorporated herein by reference.

FIELD

An embodiment described herein relates to a training apparatus and a training method for an inference system, and a recording medium.

BACKGROUND

Conventionally, inference techniques for performing recognition, classification, prediction or the like using a machine training method have been widely used.

For example, an inference apparatus using a neural network performs inference for inputted data using an inference model built using training data. The training data as supervised data is given to the neural network, and coefficient data indicating connection strength among neurons in the network is calculated to build an inference model.

There may be a case where it becomes necessary to add training data and update parameters of the inference model in order to improve inference accuracy.

However, until now, selection of training data has been performed by a worker having plenty of experience (hereinafter referred to as a skilled person) or the like, and training data as supervised data has been added one by one to execute a training process. Therefore, there is a problem that it takes much time to update the parameters of the model.

There is also a problem that, if there is imbalance in the selected training data, for example, due to seasonal fluctuations, the inference accuracy decreases.

DETAILED DESCRIPTION

A training apparatus of an embodiment is a training apparatus including a processor, and training an inference model performing predetermined inference based on data, wherein the processor changes, according to a predefined distance for a selected piece of data selected based on predefined scores given to a plurality of pieces of data in a predefined classification space, the predefined score of a piece of data other than the selected piece of data, gives labels in the predefined classification space to pieces of data including the piece of data the predefined score of which is changed, builds training data from the pieces of data to which the labels are given, and updates the inference model using the training data.

An embodiment will be described below with reference to the drawings.

First Embodiment (Configuration of Whole System)

Figure 1:
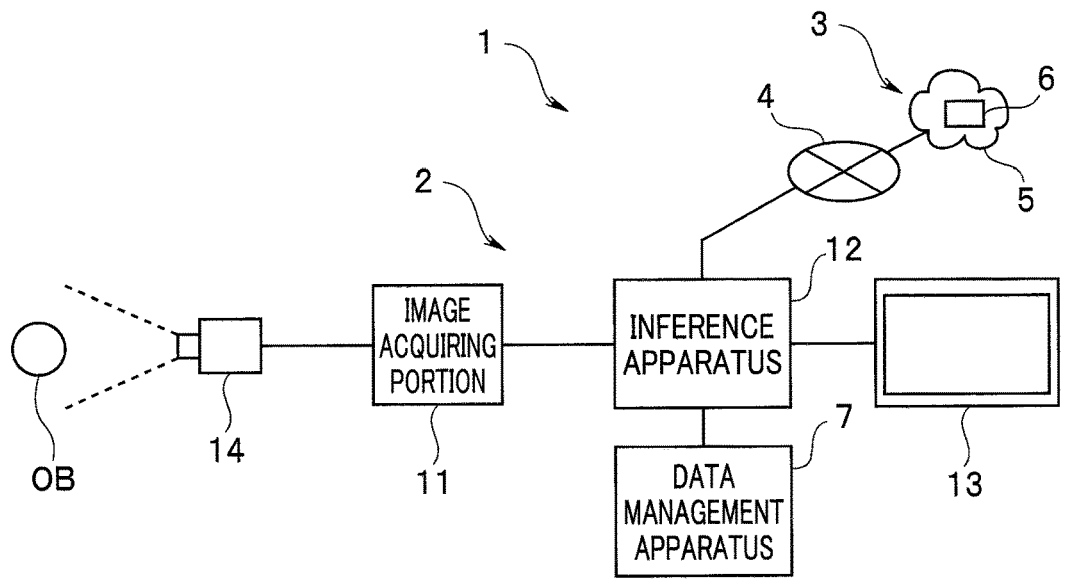
FIG. 1 is a configuration diagram of a state monitoring system according to an embodiment.

FIG. 1 is a configuration diagram of a state monitoring system according to the present embodiment.

A state monitoring system 1 includes an inference system 2 and a training system 3. Here, the state monitoring system 1 infers whether the state of a target object or a target (hereinafter simply referred to as a target) OB is normal or abnormal, based on image data of the target OB, and outputs a result of the inference. The inference result includes information showing whether the state of the target OB is normal or abnormal and, when the state is abnormal, information showing which class among abnormality classes defined in advance the state belongs to. In other words, the state monitoring system 1 is a classification system that monitors the target OB and classifies the state of the target OB based on image data.

The inference system 2 and the training system 3 are communicably connected via a network 4. For example, the network 4 is the Internet, and the training system 3 includes a training apparatus 6 on a so-called clouds. The training apparatus 6 is a server connected to the network 4 and is a computer capable of high-speed operation.

The inference system 2 is connected to a data management apparatus 7 that stores and manages inferred image data.

(Configuration of Inference System)

The inference system 2 includes an image acquiring portion 11, an inference apparatus 12 and a display apparatus 13.

A camera 14 picks up an image of the target OB to generate an image pickup signal of a moving image, and outputs the image pickup signal to the image acquiring portion 11. The target OB is, for example, a member manufactured by a manufacturing line in a factory, manufacturing equipment of the manufacturing line or a targeted object when the targeted object is being processed.

The image acquiring portion 11 acquires the image pickup signal from the camera 14, converts the image pickup signal to image data in a predetermined format and outputs the image data to the inference apparatus 12.

The inference apparatus 12 is a computer that performs a predetermined inference process for the inputted image data and outputs data of an inference result to the display apparatus 13. Here, the inference is performed by an inference engine using a neural network. Information about the inference result is displayed on the display apparatus 13.

The inference result is, for example, a detection result of making a detection of normality and abnormality of the target OB, and, in the case of abnormality, the detection result includes the kind of the abnormality, for example, abnormality 1 or abnormality 2.

A user using the state monitoring system 1 can take necessary action for facilities, equipment and the like related to manufacture and the like of the target OB by seeing the class of the target OB displayed on the display apparatus 13.

The inference apparatus 12 infers which class the state of the target OB belongs to, from the inputted image data, based on a model M which is an inference model about the class of the state of the target OB.

The model M is a model of a neural network including an input layer to which image data is inputted, a plurality of hidden layers and an output layer. Connection strength among neurons in the neural network is given to the inference apparatus 12 as parameter data PD.

For example, three pieces of color data of RGB in a 720×480 image are inputted to the input layer. Feature value data of the image data inputted to the input layer is extracted in part of the plurality of hidden layers.

Note that various kinds of feature value data of the image data may be inputted to the input layer.

The parameter data PD of the model M of the inference apparatus 12 is calculated by machine training in the training system 3, given from the training system 3 and set.

Figure 2:
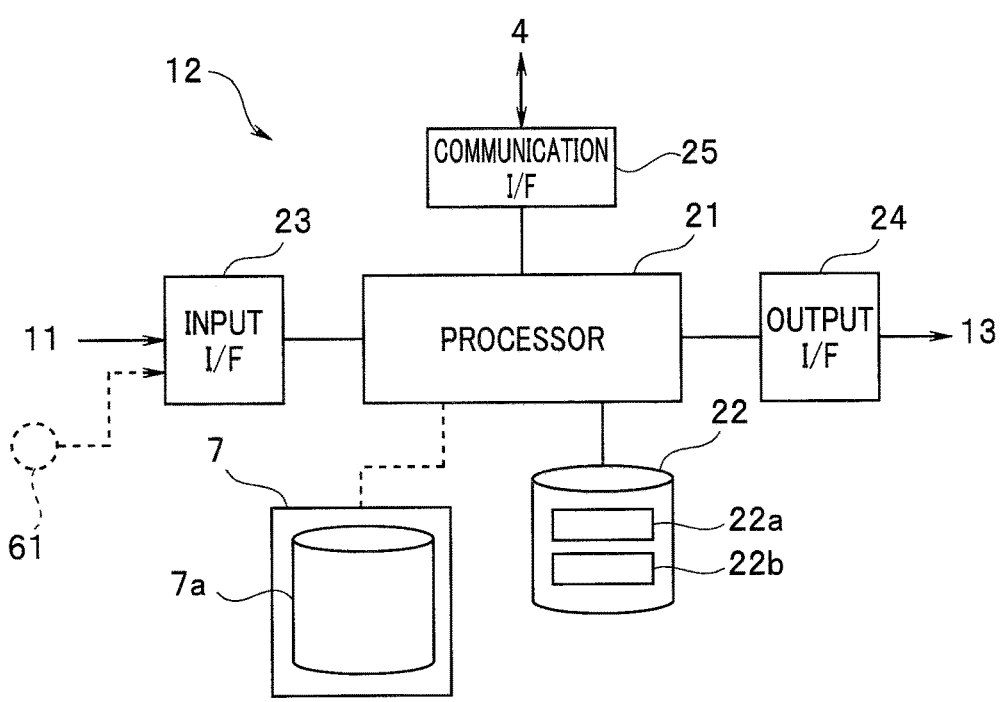
FIG. 2 is a block diagram showing a configuration of an inference apparatus according to the embodiment.

FIG. 2 is a block diagram showing a configuration of the inference apparatus 12.

The inference apparatus 12 includes a processor 21, a memory 22 for programs, an input interface (hereinafter abbreviated as an input I/F) 23 for inputting image data, an output interface (hereinafter abbreviated as an output I/F) 24 for outputting inference result data and a communication interface (hereinafter abbreviated as a communication I/F) 25.

The processor 21 is hardware including a central processing unit (CPU), a ROM, a RAM and the like and configured to read and execute a program stored in the ROM or the memory 22.

The memory 22 is a storage device including a program storage area 22a storing an inference program IP and the like, and a parameter storage area 22b storing the parameter data PD of the inference program IP. The parameter data PD of the model M is transmitted from the training system 3 and stored into the parameter storage area 22b as described later.

Note that the program storage area 22a stores other software programs such as a program of a preprocessing portion 22c described later.

The processor 21 executes the inference program IP for image data received from the input I/F 23 and outputs information about an inference result to the display apparatus 13 via the output I/F 24. For example, the inference program IP is executed for sampled image data every second.

The communication I/F 25 is a circuit for the inference apparatus 12 to communicate with the training apparatus 6 of the training system 3 via the network 4.

As indicated by a dotted line in FIG. 2, the inference apparatus 12 is connected to a data management apparatus 7 via an interface not shown.

Image data used for inference in the inference apparatus 12 is transferred to the data management apparatus 7 and stored into a memory 7a of the data management apparatus 7. In other words, the memory 7a is a storage device including an image data storage area configured to store image data for which inference has been performed by the inference program IP. For example, in a case where inference is performed for image data per second, the image data per second used for the inference is stored into the memory 7a.

Image data selected from the image data stored in the memory 7a is periodically transmitted from the inference system 2 to the training system 3 as described later. For example, image data stored in the memory 7a is transmitted to the training system 3 every week.

Note that though image data of the data management apparatus 7 is transmitted to the training system 3 via the inference apparatus 12 here, the image data may be directly transmitted from the data management apparatus 7 to the training system 3.

Furthermore, it is also possible for the user to manually transmit image data selected by the user from the image data stored in the memory 7a to the training system 3.

Image data stored in the memory 7a is erased when the image data is transferred to the training system 3. After that, image data per second used for inference is stored into the memory 7a.

Figure 3:
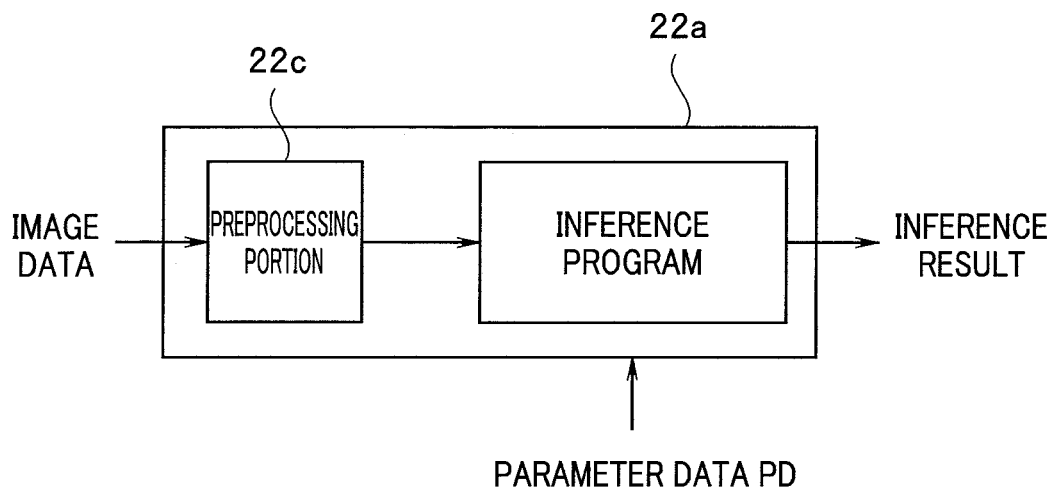
FIG. 3 is a block diagram for illustrating input/output of data by an inference program according to the embodiment.

FIG. 3 is a block diagram for illustrating input/output of data by the inference program IP. The inference program IP includes a function as the preprocessing portion 22c configured to extract feature value data of image data inputted from the image acquiring portion 11 via the input I/F 23.

As shown in FIG. 3, the image data from the image acquiring portion 11 is inputted to the preprocessing portion 22c.

The preprocessing portion 22c calculates data of a predetermined feature value and the like from the image data and outputs the data.

The inference program IP is a program configured to perform inference for the data outputted from the preprocessing portion 22c using the parameter data PD read from the parameter storage area 22b. The inference program IP inputs data from the preprocessing portion 22c and outputs inference result information using the model M which is an inference model using a neural network.

The inference result information is displayed on the display apparatus 13, for example, together with an image of the target OB and probability data for each class.

The parameter data PD of the model M is transmitted from the training system 3 as described above.

(Inference Method)

Figure 4:
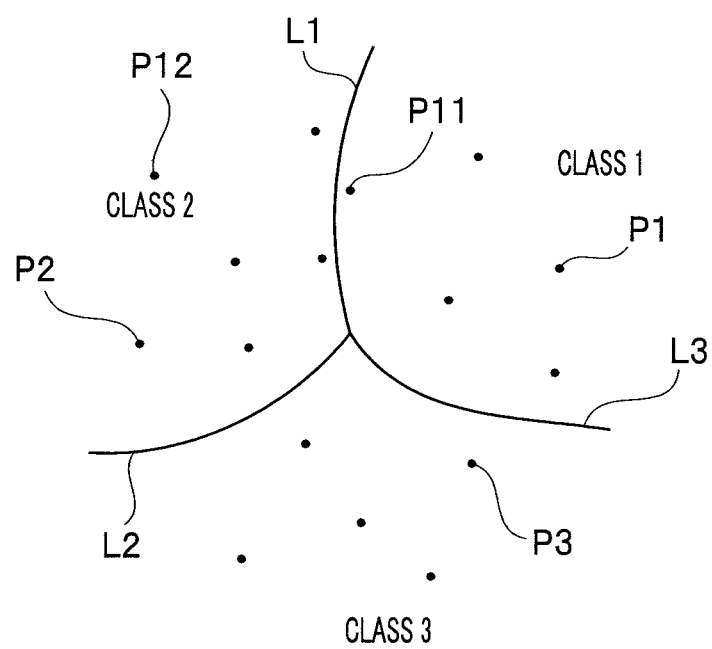
FIG. 4 is a diagram for illustrating an inference method according to the embodiment.

FIG. 4 is a diagram for illustrating an inference method.

Here, an example of a case of three classes in a two-dimensional classification space will be described for simplification of explanation. In FIG. 4, classes 1, 2 and 3 are defined based on identification boundaries L1, L2 and L3 in a classification space.

An inference result is given as a coordinate position or a vector of each piece of image data in the classification space as indicated as a point in FIG. 4. Each point indicates a position of coordinates of each piece of image data in the classification space.

In FIG. 4, for example, points P1, P2 and P3 belong to the classes 1, 2 and 3, respectively.

The inference program IP also calculates the probability of coordinates of each point belonging to each class.

For example, coordinates of the point P1 belong to an area of the class 1 defined by the identification boundaries L1 and L3, and are located away from areas of the other classes in the classification space. In that case, a probability Pr1 of belonging to the class 1 calculated for the coordinates of the point P1 is high, and both of a probability Pr2 of belonging to the class 2 and a probability Pr3 of belonging to the class 3 are low.

In FIG. 4, though coordinates of a point P11 belong to the area of the class 1, the coordinates are also close to the area of the class 2 but are located away from the area of the class 3. In that case, the probability Pr1 of belonging to the class 1 calculated for the coordinates of the point P11 is the highest; the probability Pr2 of belonging to the class 2 is the highest next to the probability Pr1; and the probability Pr3 of belonging to the class 3 is low.

As described above, the inference program IP classifies the state of the target OB from inputted image data and calculates the probability of the coordinates of each point belonging to each class, using the model M defined by the parameter data PD given from the training system 3.

(Configuration of Training System)

The training system 3 trains and calculates a plurality of pieces of parameter data PD of the model M using training data selected from image data accumulated in the data management apparatus 7.

Note that though the training system 3 is constructed as a cloud system on the Internet here, the training system 3 may be an apparatus connected to the inference system 2 via a communication line such as a LAN. For example, when there are a plurality of inference systems 2 performing similar inference, one training system 3 connected to a communication line such as a LAN may be adapted to, for the plurality of inference systems 2, calculate the parameter data PD of the model M of each inference system 2.

Figure 5:
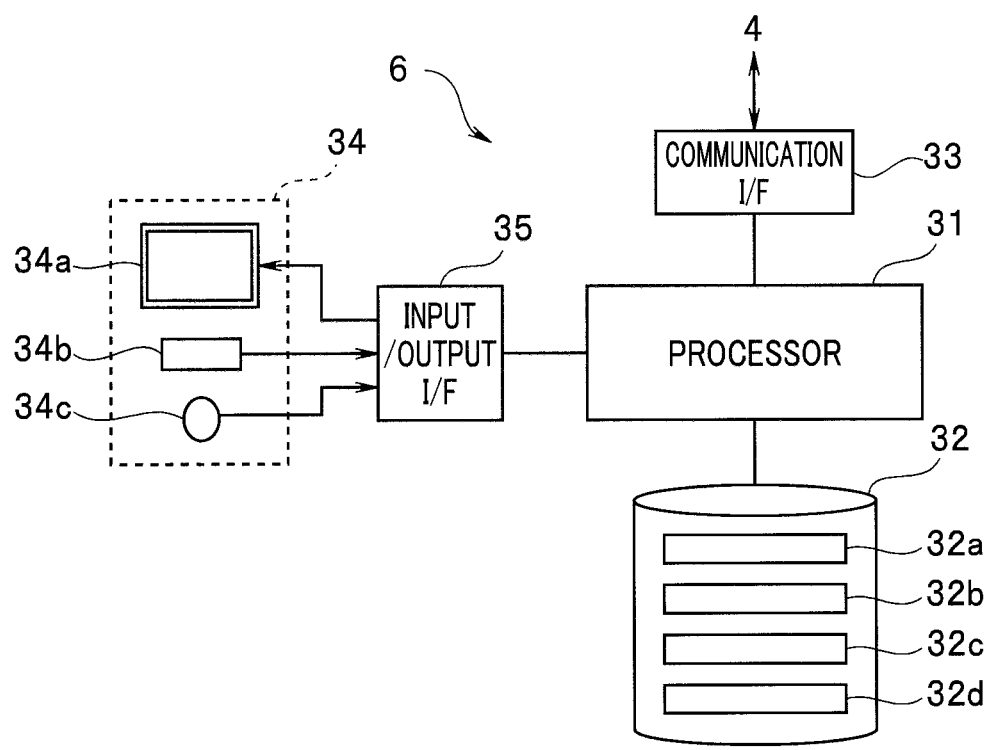
FIG. 5 is a block diagram showing a hardware configuration of a training apparatus of a training system according to the embodiment.

FIG. 5 is a block diagram showing a hardware configuration of the training apparatus 6 of the training system 3.

The training apparatus 6 includes a processor 31, a memory 32, a communication IN 33, an input/output device 34, and an input/output interface (hereinafter abbreviated as an input/output I/F) 35.

The processor 31 is hardware including a central processing unit (CPU), a ROM, a RAM and the like and configured to read and execute a program TP or the like stored in the ROM or the memory 32.

New parameter data nPD of the model M calculated by training is transmitted from the training system 3 and stored into the parameter storage area 22b of the inference apparatus 12 as described later.

The memory 32 includes a data storage area 32a, a program storage area 32b, a parameter storage area 32c and a training data storage area 32d.

In the data storage area 32a, image data received from the inference system 2 is stored and accumulated.

In the program storage area 32b, the training program TP and the like are stored. A configuration of the training program TP will be described later.

In the parameter storage area 32c, parameter data nPD calculated by training is stored. The parameter data nPD stored in the parameter storage area 32c is the same as the parameter data PD stored in the parameter storage area 22b of the inference system 2.

In the training data storage area 32d, image data used to calculate the parameter data nPD is stored as training data.

The communication I/F 33 is a circuit for the training apparatus 6 to communicate with the inference apparatus 12 of the inference system 2 via the network 4.

The input/output device 34 is a user interface including a display device 34a, a keyboard 34b, a mouse 34c and the like.

An input/output I/F 35 is a circuit for exchanging various kinds of signals between the processor 31 and the input/output device 34.

The processor 31 executes the training program TP or the like using training data, based on an instruction received from the input/output I/F 35. The training program TP outputs parameter data nPD calculated by training to the parameter storage area 32c.

The processor 31 transfers the new parameter data nPD calculated in the training apparatus 6 to the inference apparatus 12 via the network 4. The parameter data nPD is stored into the parameter storage area 22b of the inference apparatus 12 as the parameter data PD.

The user, who is a skilled person, can give an instruction periodically or at an arbitrary timing to add supervised data to image data of training data displayed on the display device 34a of the training apparatus 6, calculate parameter data nPD and update the parameter data PD of the inference apparatus 12.

For example, the inference system 2 accumulates image data used for inference in the data management apparatus 7 for a predetermined period, for example, for one week. The training apparatus 6 receives the image data used for inference from the inference system 2 periodically, for example, every week. In other words, in the data storage area 32a, image data periodically received from the inference system 2 is accumulated in a manner of being added to past image data.

Therefore, when the training system 3 receives image data corresponding to a predetermined period from the inference system 2, the user may execute the training program TP to transmit new parameter data nPD or may calculate the new parameter data nPD, looking at a distribution situation of scores Sc obtained by executing the training program TP and update the parameter data PD of the inference apparatus 12.

The training data stored into the training data storage area 32d is image data used for model update of the model M.

Figure 6:
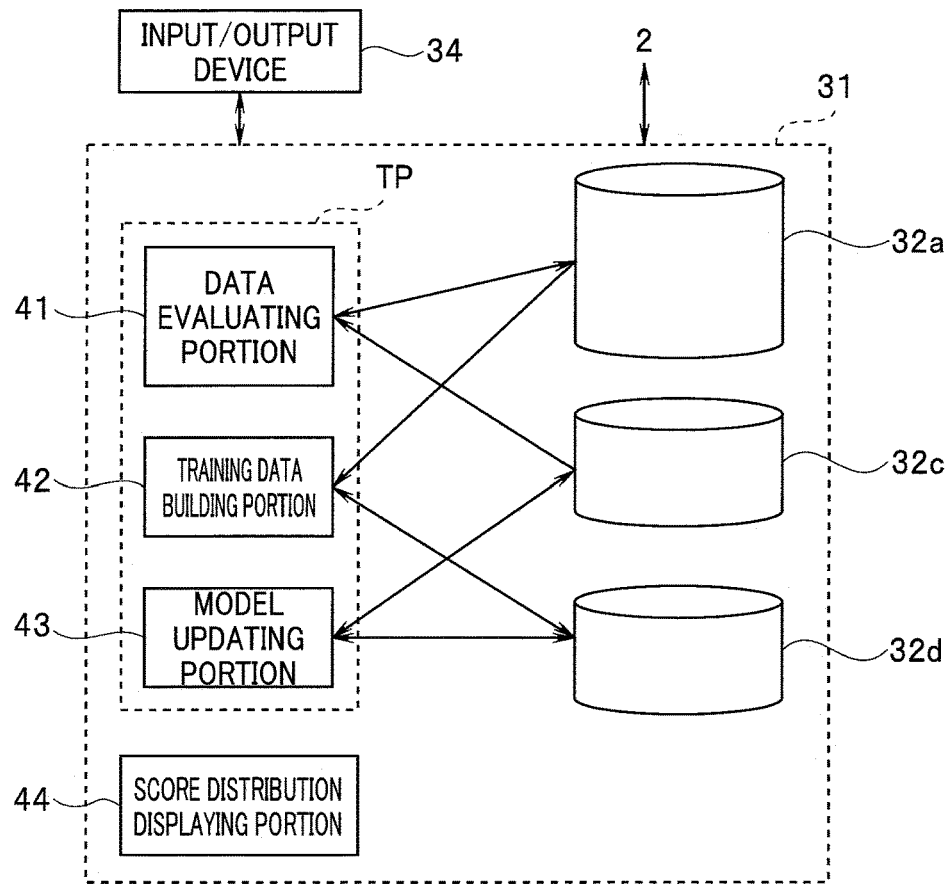
FIG. 6 is a block diagram for illustrating a configuration of a process of the training apparatus according to the embodiment.

FIG. 6 is a block diagram for illustrating a configuration of a process of the training apparatus 6.

The training program TP stored in the program storage area 32b includes a data evaluating portion 41, a training data building portion 42 and a model updating portion 43. The data evaluating portion 41, the training data building portion 42 and the model updating portion 43 are software programs.

The data evaluating portion 41 performs data evaluation in response to an instruction by the user from the input/output device 34. The data evaluation includes a process of performing inference for the image data stored in the data storage area 32a, calculating predefined scores from an inference result, changing the calculated scores, presenting the image data to the skilled person according to the changed scores and causing the skilled person to give labels to the image data.

The training data building portion 42 builds training data from the image data to which the labels have been given by the data evaluating portion 41 and adds the training data to the training data storage area 32d.

The model updating portion 43 calculates new parameter data nPD of the model M based on the updated training data and updates the parameter data nPD by storing the calculated parameter data nPD into the parameter storage area 32c. In other words, the model updating portion 43 updates the model M using the training data.

A score distribution displaying portion 44 included in the processor 31 is a program stored in the program storage area 32b. The score distribution displaying portion 44 is a program configured to create a graph showing distribution of scores Sc calculated by a score calculating portion 52 described later and output data of the created graph.

Figure 7:
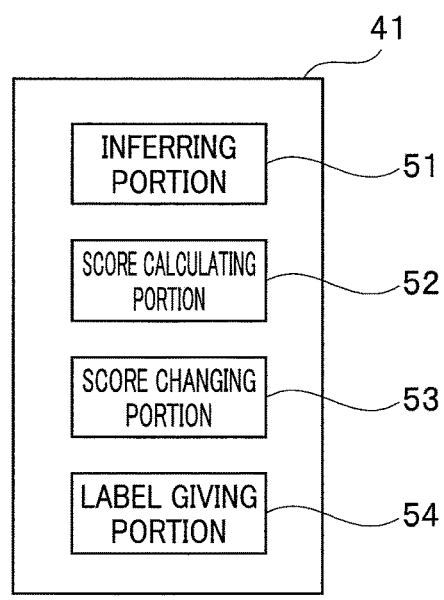
FIG. 7 is a block diagram showing a configuration of a data evaluating portion according to the embodiment.

FIG. 7 is a block diagram showing a configuration of the data evaluating portion 41.

The data evaluating portion 41 includes an inferring portion 51, the score calculating portion 52, a score changing portion 53 and a label giving portion 54.

The inferring portion 51 includes an inference program IPa and executes the inference program IPa for image data. The inference program IPa is the same program as the inference program IP used in the inference system 2, and executes inference for the image data stored in the data storage area 32a using the parameter data nPD stored in the parameter storage area 32c.

The inferring portion 51 performs classification of each piece of image data and also calculates a probability of belonging to each class.

The score calculating portion 52 calculates a predefined score from data of the probability of belonging to each class for each piece of image data.

The classification of each piece of image data is inferred by an inference process using a neural network, with a plurality of feature values for the piece of image data as an input. The classification of each piece of image data is inferred based on which of class areas defined by identification boundaries, coordinates of a point in a multidimensional classification space is included in. In the inference, a probability of belonging to each class is also calculated for each point. The score Sc is a value obtained by converting shortness of the distance of each point from an identification boundary in a predefined classification space to a numerical value based on calculated probability data. In other words, the score Sc is a value corresponding to closeness of each point to the identification boundary in the predefined classification space, and the distance is a distance of each point from an identification boundary in the predefined classification space.

To describe the example of FIG. 4 for simplification of explanation here, a right side of the identification boundary L1 is the area of the class 1, and a left side of the identification boundary L1 is the area of the class 2. Since the point P11 is located on the right side of the identification boundary L1 in FIG. 4, image data corresponding to the point P11 is inferred to belong to the class 1. At the time of the inference, the probability Pr1 of the point P11 belonging to the class 1 and the probability Pr2 of the point P11 belonging to the class 2 are also calculated.

The score Sc is calculated based on data of probability of belonging to each class in a multidimensional space. In the example of FIG. 4, the probability Pr1 of the point P11 belonging to the class 1 and the probability Pr2 of the point P11 belonging to the class 2 are calculated by the inference program IPa first. The score Sc is calculated by a function of a difference between two calculated probabilities Pr1 and Pr2.

For example, the score Sc is given by the following equation.

$$Sc = f(|Pr1 - Pr2|)$$

Here, f is a function of an absolute value of a difference between two probabilities and is such a function that the value of Sc increases as the difference is smaller, and the value of Sc decreases as the difference is larger. The score Sc is normalized so as to be a value, for example, between 0.0 and 1.0. As a simple example, f is an equation for calculating a reciprocal of an absolute value of a difference between two probabilities.

Since the point P11 is close to the identification boundary L1, the value of the score Sc of the point P11 is large.

Since a point P12 belonging to the class 2 is away from the identification boundary L1 and belongs to the area of the class 2, the probability Pr2 is high, and the probability Pr1 is low. Therefore, since a difference between the two probabilities is large, the value of the score Sc is small.

Note that the function f may be a linear equation or a nonlinear equation according to a difference between two probabilities.

As described above, the score calculating portion 52 calculates the scores Sc of all the pieces of image data added to the data storage area 32a.

The score distribution displaying portion 44 described above generates a graph showing distribution of the values of the scores of a plurality of pieces of image data calculated by the score calculating portion 52.

Figure 8:
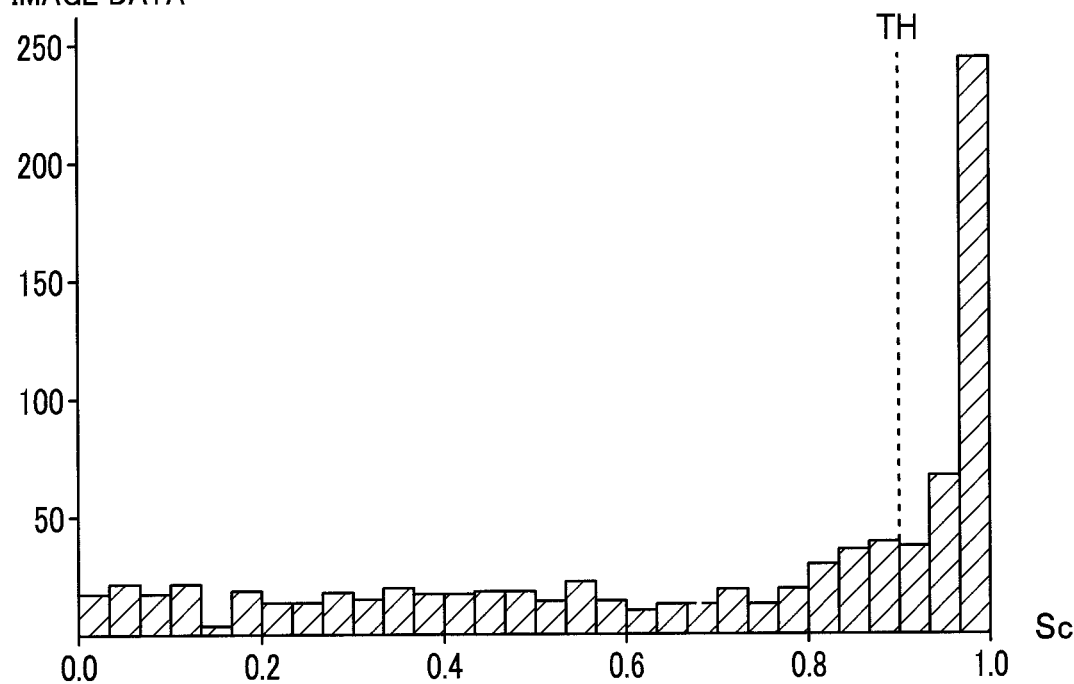
FIG. 8 is a diagram showing an example of a graph of score distribution according to the embodiment.

FIG. 8 is a diagram showing an example of the graph of score distribution. A vertical axis indicates the number of pieces of image data, and a horizontal axis indicates the scores Sc.

FIG. 8 shows distribution of a plurality of scores Sc calculated for a plurality of pieces of image data when the score Sc takes a value of 0.0 to 1.0.

Being closer to "0.0" indicates the image data being farther away from two upper identification boundaries in the classification space, and being closer to "1.0" indicates the image data being closer to the two upper identification boundaries in the classification space.

In FIG. 8, a dotted line indicates a predetermined threshold TH for the scores Sc, and the user can intuitively grasp from the graph a rate of the number of pieces of image data having scores Sc larger than the threshold TH.

In other words, the user can intuitively grasp the state of the model M by looking at the distribution state of the scores Sc in FIG. 8.

As described above, the score distribution displaying portion 44 configures a distribution display data outputting portion configured to output distribution display data to display distribution of predefined scores Sc on the display device 34a.

Returning to FIG. 7, the calculated scores Sc are updated by the score changing portion 53.

The score changing portion 53 changes the scores Sc of the image data obtained by calculation by the score calculating portion 52. For example, for all the pieces of image data stored in the data storage area 32a, data of the scores Sc are stored into a buffer area such as the RAM of the processor 31.

In the change of the scores Sc by the score changing portion 53, the values of the scores Sc are changed so that image data of points closer to the same identification boundary is not selected as training data.

Figure 9:
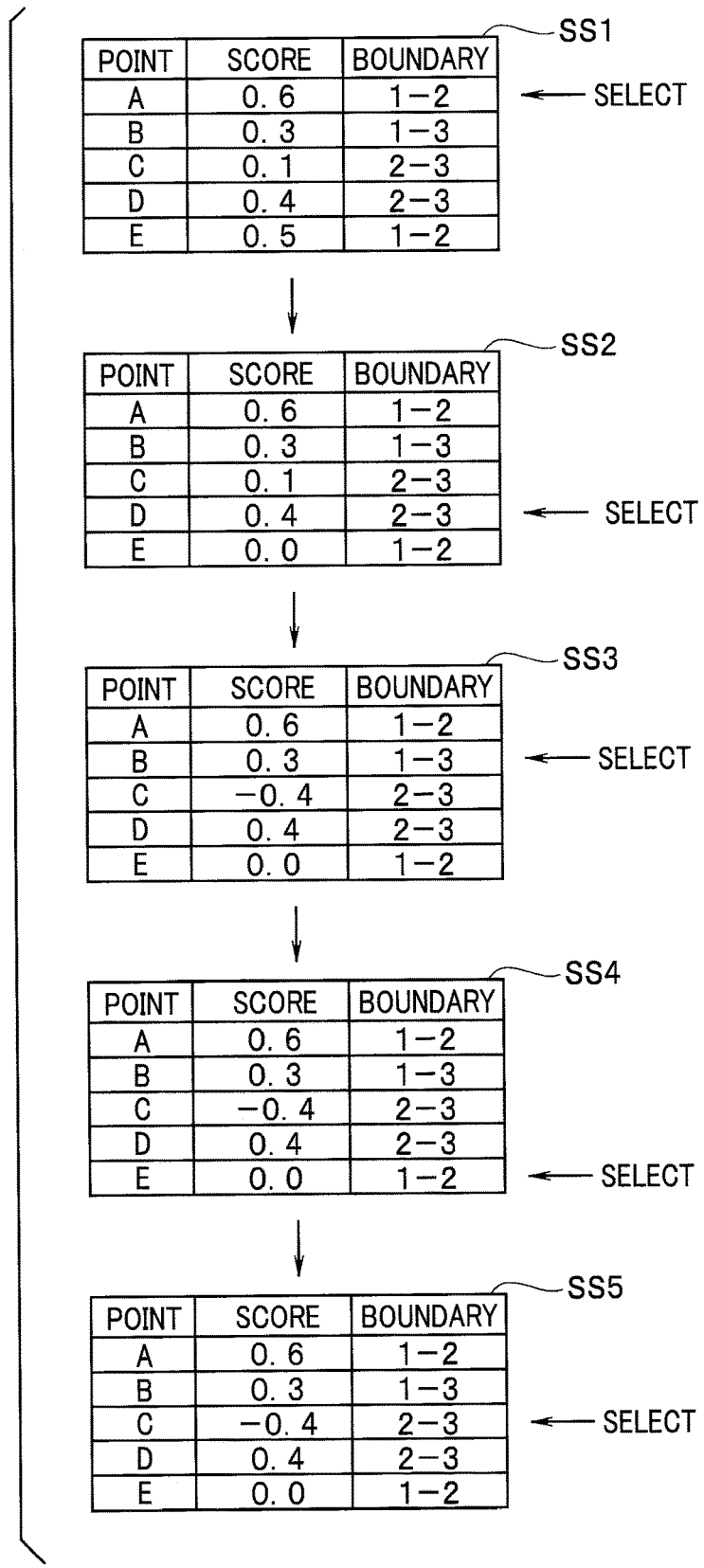
FIG. 9 is a diagram for illustrating change in the values of scores for points in a classification space in which three classes are defined, by a score changing portion according to the embodiment.

FIG. 9 is a diagram for illustrating changes in the values of scores Sc for points in the classification space in which the three classes 1, 2 and 3 are defined, by the score changing portion 53.

Here, an example of scores Sc for five points will be described for simplification of explanation. In FIG. 9, each of tables SS1 to SS5 shows scores for respective points A, B, C, D and E of respective pieces of image data in a classification space and identification boundaries close to the respective points. The scores for the respective points A, B, C, D and E are changed from the scores of SS1 to the scores of SS5.

Here, SS1 is a table showing scores of the respective points calculated by the score calculating portion 52. In SS1, it is shown that the score of the point A is "0.6" and that the identification boundary is "1-2" which is an identification boundary between the classes 1 and 2. It is shown that the score of the point B is "0.3" and that the identification boundary is "1-3" which is an identification boundary between the classes 1 and 3. The scores and identification boundaries of the other points C, D and E are also shown as shown in FIG. 9.

The score changing portion 53 repeats a process of sequentially selecting a point having a score Sc with the largest value and changing the values of scores Sc of remaining points other than the selected point.

In the case of FIG. 9, since the score Sc of the point A is the largest in SS1, the score changing portion 53 selects the point A. The identification boundary of the selected A is "1-2".

The score changing portion 53 gives a penalty to the score Sc of a point, the identification boundary of which is the same as the identification boundary of the selected A. Giving a penalty means, for example, to reduce the value of the score Sc.

Here, a predetermined value is subtracted from the value of the score Sc by the penalty. In SS2, the score of the point E, the identification boundary of which is "1-2", is changed to "0, 0" by the predetermined value, here, 0.5 being subtracted from the score.

The score changing portion 53 selects a point having a score Sc with the largest value, among the remaining points B, C, D and E excluding the point A, after executing the process of giving such a penalty. Since the score Sc of the point D is the largest in SS2, the score changing portion 53 selects the point D. The identification boundary of the selected D is "2-3".

The score changing portion 53 gives a penalty to the score Sc of a point, the identification boundary of which is the same as the identification boundary of the selected D.

Here, the predetermined value is subtracted from the value of the score Sc of the point C, the identification boundary of which is "2-3", by the penalty, and the score Sc is changed to "−0.4".

After that, the score changing portion 53 selects a point having a score Sc with the largest value, among the remaining points B, C and E excluding the points A and D. Since the score Sc of the point B is the largest in SS3, the score changing portion 53 selects the point B. The identification boundary of the selected B is "1-3".

The score changing portion 53 gives the penalty to the score Sc of a point, the identification boundary of which is the same as the identification boundary of the selected point B. However, since there is not a point, the identification boundary of which is "1-3" between the remaining points C and E, the penalty is not given.

After that, the score changing portion 53 selects a point having a score Sc with the largest value, between the remaining points C and E excluding the points A, B and D. Since the score Sc of the point E is the largest in SS4, the score changing portion 53 selects the point E. The identification boundary of the selected E is "1-2".

The score changing portion 53 gives the penalty to the score Sc of a point, of which the identification boundary is the same as the identification boundary of the selected point B. However, since the identification boundary of the remaining point C is not "1-2", the penalty is not given.

After that, the score changing portion 53 selects the remaining point C excluding the points A, B, D and E as shown in SS5.

As described above, according to a predefined distance of selected data selected based on predefined scores Sc given to a plurality of pieces of data (here, image data) in a predefined classification space, here, according to a distance from the same identification boundary, the score changing portion 53 changes predefined scores Sc of data other than the selected data. Here, the scores of unselected pieces of data are changed so that distances from the data already selected as training data become long.

In other words, the score changing portion 53 adjusts the score of a point related to the same identification boundary as a point with a high score Sc, by giving a penalty to the score Sc of the point close to the same identification boundary.

Returning to FIG. 7, the label giving portion 54 executes a process of displaying an image on the display device 34a of the input/output device 34, causing the user to perform instruction about the image data (that is, causing the user to give a label) and storing the given label, that is, data of a class in association with the image data stored in the data storage area 32a.

The label giving portion 54 displays a predetermined number of, for example, k pieces of image data in descending order of the scores changed by the score changing portion 53. For example, one hundred pieces of image data are displayed on the display device 34a in descending order of scores.

In other words, the label giving portion 54 gives labels in a predefined classification space to data including the pieces of image data, the scores Sc of which have been changed.

The skilled person who is an expert worker capable of detecting the state of the target OB from image data looks at the image displayed on the display device 34a and inputs a label, that is, information about a class, to the input/output device 34.

The label giving portion 54 stores the data of the classes, that is, the labels inputted by the skilled person into a buffer such as the RAM of the processor 31 in association with the image data.

(Operation of Training Apparatus)

A process of the inference model training apparatus 6 will be described. The training apparatus 6 performs training of an inference model for making a predetermined inference based on data.

Figure 10:
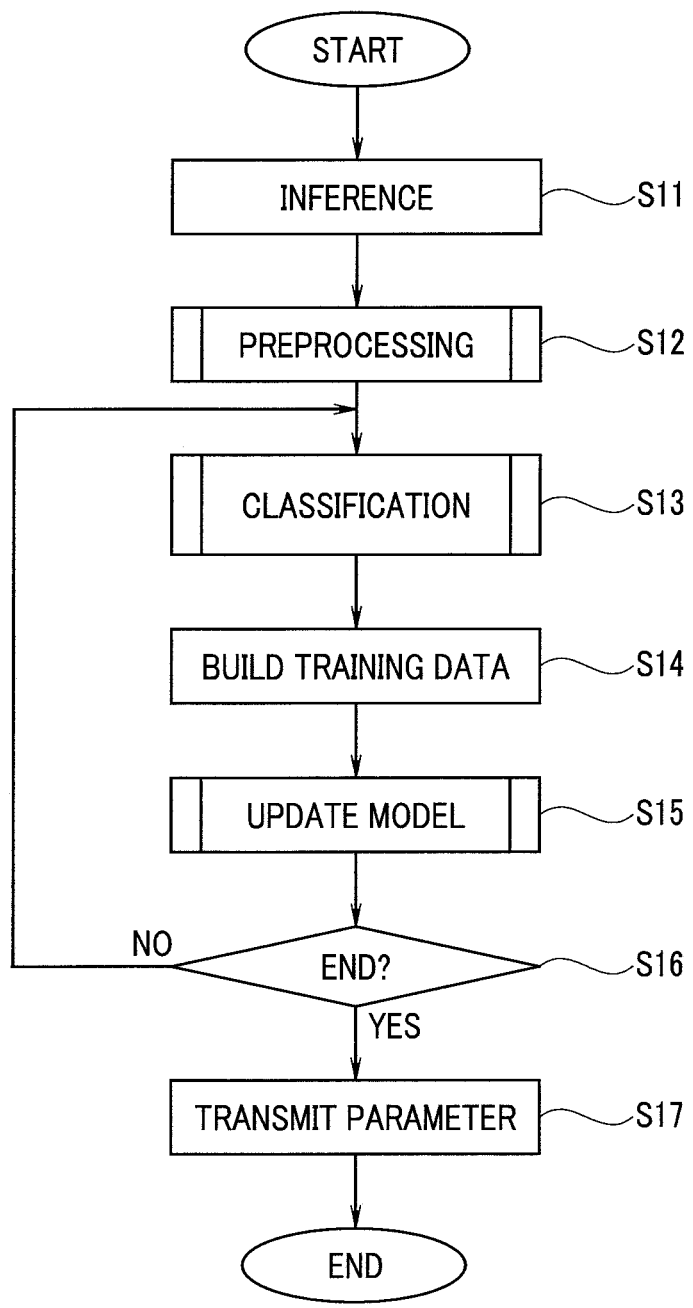
FIG. 10 is a flowchart showing an example of a flow of a process of a training program according to the embodiment.

FIG. 10 is a flowchart showing an example of a flow of a process of the training program TP.

For example, when image data corresponding to one week is transmitted from the inference system 2 to the training system 3 every week, the user is prompted to execute a model update process at a timing of receiving the image data. Seeing a message "Give label to new image data"

displayed on the display device 34a, the user instructs the training apparatus 6 to execute a training process.

When the user operates the input/output device 34 to instruct the training apparatus 6 to execute the training process, the processor 31 executes inference by the inference program IPa for all the image data stored in the data storage area 32a (step (hereinafter abbreviated as S) 11). At S11, a probability Pr of each piece of image data belonging to each class is calculated.

The processor 31 executes preprocessing for each piece of image data for which inference has been executed (S12).

In the preprocessing at S12, calculation of scores Sc by the score calculating portion 52 and change of the scores Sc by the score changing portion 53 are performed. Calculation of the scores Sc is performed by a predetermined function as described above. The score Sc indicates closeness of the position of each piece of image data in a classification space to each identification boundary. Here, the closer to an identification boundary in the classification space a point is, the higher the score Sc is; and, the farther from the identification boundary in the classification space a point is, the lower the score Sc is.

Figure 11:
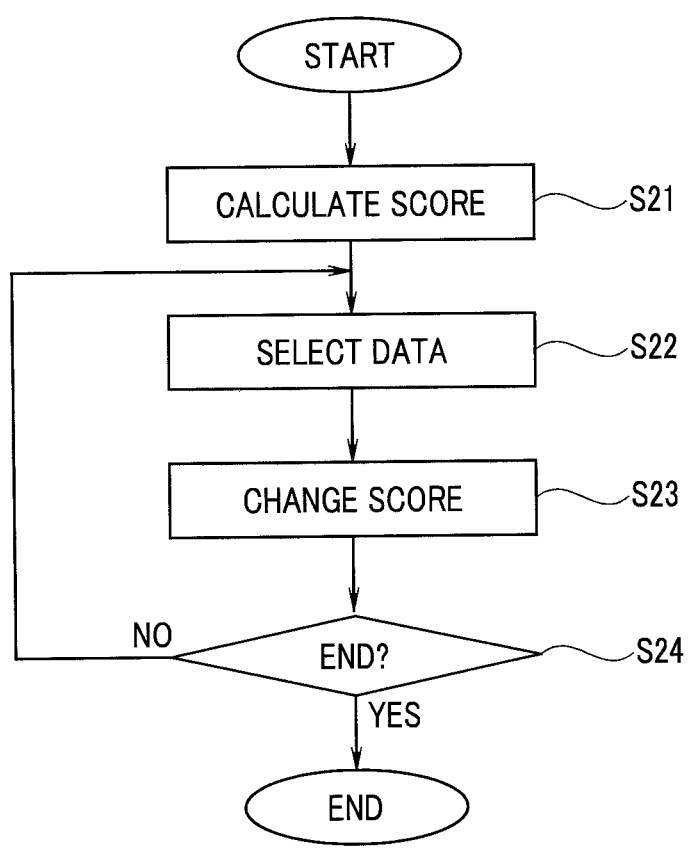
FIG. 11 is a flowchart showing an example of a flow of a process of preprocessing according to the embodiment.

FIG. 11 is a flowchart showing an example of a flow of a process of the preprocessing (S12).

The processor 31 calculates the scores of all the pieces of image data stored in the data storage area 32a from probability data of the respective pieces of image data obtained from inference (S21).

After S21, the processor 31 selects one piece of image data in descending order of the scores Sc (S22).

As shown in FIG. 9, by giving a penalty to the score Sc of the same identification boundary as the identification boundary of the selected piece of image data, the processor 31 changes the score Sc of image data other than the selected piece of image data (S23).

The processor 31 determines whether or not to end the preprocessing (S24). Whether or not to end the preprocessing is determined based on whether or not the selection of S21 has been performed for all the pieces of image data, and there is not any other image data, the score of which is to be changed. If all the pieces of image data have not been selected (S24: NO), the process returns to S22.

When all the pieces of image data have been selected (S24: YES), the process ends.

Even if images with high scores Sc concentrate at the same identification boundary as a result of the calculation of the scores Sc at S21, the images with high scores Sc changed by the score Sc changing process do not concentrate at the same identification boundary.

Returning to FIG. 10, the processor 31 executes a classification process for a predetermined number of, for example, k pieces of image data in descending order of the scores Sc changed by the preprocessing (S13).

More specifically, the pieces of image data are displayed on the display device 34a in descending order of the changed scores Sc, and the skilled person looks at the images and performs instruction to label the pieces of image data. A predetermined number of pieces of image data are selected; the pieces of image data are displayed on the display device 34a one by one; and instruction by the skilled person is performed.

After the classification, the processor 31 builds training data by the training data building portion 42 (S14). The training data is data for deep training More specifically, the processor 31 reads a predetermined number of pieces of image data, among the pieces of image data, the scores Sc of which have been re-given by the data evaluating portion 41, from the data storage area 32a, and adds the pieces of image data to the training data storage area 32d as training data.

The training data is added to the training data storage area 32d by S14, and, in the training data storage area 32d, newest training data used to calculate new parameter data nPD of the model M is stored.

The processor 31 updates the model M using the newest training data by the model updating portion 43 (S15). More specifically, the model updating portion 43 calculates parameter data nPD of the model M by a method such as a back propagation method, using the training data stored in the training data storage area 32d.

The processor 31 determines whether or not to end the training process (S16). For example, the determination about whether or not to end the training process may be made by inquiring of the user whether or not to further perform classification or the like so that the user can make the determination, or the determination may be automatically made by a determination about whether or not a rate of the number of scores Sc equal to or above a predetermined threshold value TH to the number of all the scores Sc of the training data has become equal to or below a predetermined value (whether or not a rate of the number of pieces of image data far from identification boundaries has become equal to or above a predetermined value).

If the training process is not to be ended (S16: NO), the process returns to S13.

A predetermined number of, for example, k pieces of remaining uninstructed image data are selected in descending order of scores Sc, from among the pieces of image data, the scores Sc of which have been changed in the preprocessing, and the process of classification (S13) is executed.

If the training process is to be ended (S16: YES), the processor 31 transmits the parameter data nPD calculated and stored in the parameter storage area 32c to the inference system 2 (S17).

As described above, according to the embodiment described above, since it is possible to add a plurality of pieces of training data in order not to cause inference accuracy to decrease, it is possible to shorten a time period required to update parameters of an inference model.

Therefore, according to the embodiment described above, it is possible to provide a training apparatus and a training method for an inference system that shortens a time period required to update parameters of an inference model and prevents decrease in inference accuracy, and a program for the training method.

Especially, since the score of a piece of image data close to the same identification boundary is changed by score change, image data used in instruction by the skilled person does not include many pieces of image data close to the same identification boundary in a classification space. Therefore, it is possible to cause the skilled person to collectively perform instruction for a plurality of pieces of image data.

For example, there may be a case where pieces of image data with high scores Sc concentrate at the same identification boundary due to seasonal fluctuations and the like. When the number of pieces of data close to one particular identification boundary increases due to seasonal fluctuations and the like, the whole identification accuracy of inference of the model M decreases.

According to the method of the embodiment described above, however, it is possible to, even in such a case, accurately update the model M in a short time using a plurality of pieces of training data, without causing the whole identification accuracy to decrease.

Next, modifications of the embodiment described above will be described.

Modification 1

Though training data is composed only of supervised data to which labels are given in the embodiment described above, uninstructed data for which instruction by the skilled person has not been performed may be included.

The uninstructed data can be selected from the data storage area 32a based on the scores Sc of image data and added as training data.

Figure 12:
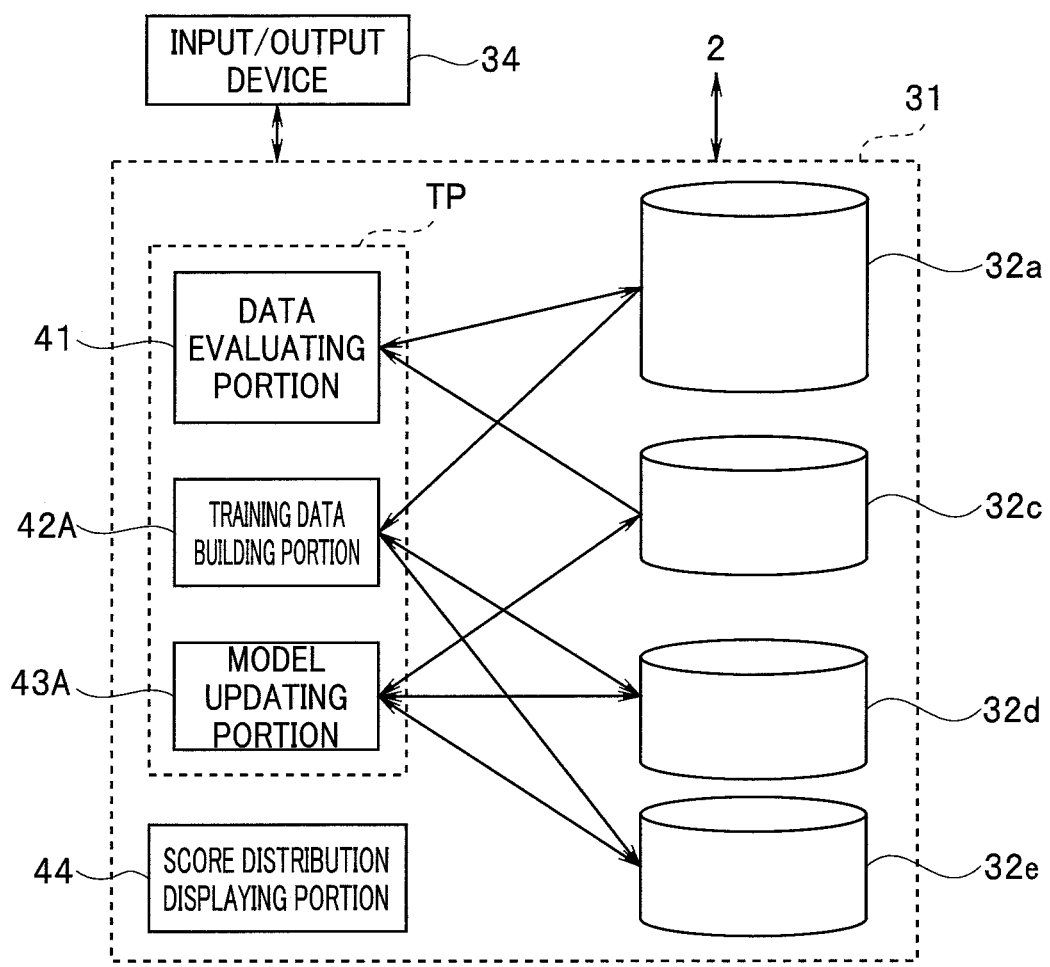
FIG. 12 is a block diagram showing a configuration of a process of the training apparatus according to a modification 1 of the embodiment.

FIG. 12 is a block diagram showing a configuration of a process of the training apparatus 6 according to the present modification 1.

In FIG. 12, the same components as components of the training apparatus 6 of the embodiment will be given the same reference numerals, and description of the components will be omitted. The memory 32 includes an uninstructed data storage area 32e.

A training data building portion 42A extracts uninstructed data from the image data stored in the data storage area 32a based on scores Sc and stores the uninstructed data into the uninstructed data storage area 32e of the memory 32.

In the case of the example described above, since scores Sc are added in the preprocessing (S12), the training data building portion 42A selects a predetermined number of, for example, L pieces of image data having scores Sc with small values, among the scores Sc, that is, L pieces of image data far from identification boundaries, and adds the L pieces of image data to the uninstructed data storage area 32e as training data.

In other words, the training data building portion 42A adds such data that a predefined distance in a predefined classification space is long, to the uninstructed data storage area 32e as training data, based on predefined scores Sc. Here, such data that the predefined score Sc is equal to or below a predetermined value is set as the training data. As a result, the parameter data PD of the model M is updated, for example, so that, as for an inference probability of image data belonging to a classification space with the highest inference probability, the inference probability in the classification space with the highest inference probability is 100%, and the inference probability in other classification spaces is 0%.

Note that various methods are possible as a method for setting an inference probability at the time of registering uninstructed image data with the uninstructed data storage area 32e as training data. The value of the inference probability of each classification space may be set to 20%, 30% or the like instead of 100% or 0% in consideration of noise and the like included in image data.

A model updating portion 43A updates the parameter data PD of the model M using the supervised data stored in the training data storage area 32d and the uninstructed data stored in the uninstructed data storage area 32e.

According to the modification 1, since training data that also includes high-probability data belonging to each class is used, the inference accuracy of the model M can be further improved.

Modification 2

Though labeling is performed by the skilled person in the training system 3, in the embodiment described above, labels may be automatically given according to detection values of a sensor or the like.

For example, when an output of a color sensor, a gas sensor or the like reaches a predetermined value or above, a label corresponding to a predetermined classification can be given to image data.

For example, in the inference apparatus 12, the input/output I/F 23 is connected to the sensor 61 as shown by a dotted line in FIG. 2, and the processor 21 acquires a detection value from the sensor 61 in association with an image data acquisition timing. The detection value of the sensor 61 is stored into the memory 7a in association with the image data and transmitted to the training system 3.

The label giving portion 54 holds label data set in advance according to detection values of the sensor 61. The label giving portion 54 can automatically give a label to each piece of image data according to a detection value of the sensor 61.

Therefore, since labeling can be automatically performed by the label giving portion 54, work efficiency can be improved.

Modification 3

Though the label giving portion 54 presents pieces of image data in descending order of the scores Sc calculated and changed in the preprocessing in the embodiment described above, the changed scores Sc may be further changed according to labels given to the presented pieces of image data.

For example, though the user looks at a presented image and gives a label to image data of the image in the class (S13) in FIG. 10, a penalty may be given to the score Sc of a piece of image data inferred to belong to the same label as the given label, among unselected pieces of image data.

Figures 13, 14:
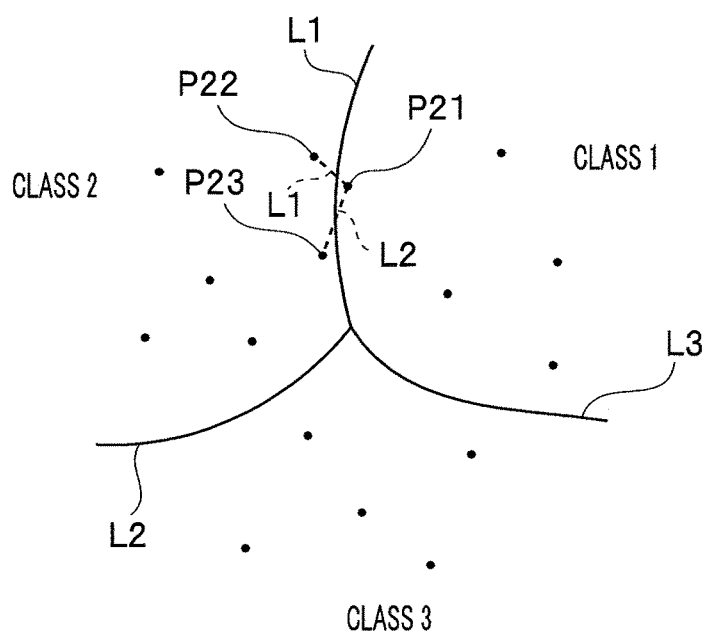
FIG. 13 is a diagram for illustrating an example of giving a penalty for the points in the classification space in which the three classes are defined, by a label giving portion according to a modification 3 of the embodiment.
FIG. 14 is a diagram for illustrating giving of a penalty according to a modification 4 of the embodiment.

FIG. 13 is a diagram for illustrating an example of giving a penalty for the points in the classification space in which the three classes 1, 2 and 3 are defined, by the label giving portion 54 according to the present modification 3. Similarly to FIG. 9, each of tables SS11 and SS12 shows scores for the respective points A, B, C, D and E of respective pieces of image data in a classification space, identification boundaries close to the respective points, and classifications.

As the class, such a class that the probability of each point belonging to the class is the highest is shown.

The label giving portion 54 presents image data with the highest score Sc to the user, and the user gives a class to the image data. In FIG. 13, it is assumed that the class 2 is given to image data A.

In that case, for the score Sc of uninstructed image data inferred to belong to the class 2, a penalty process, here, a process of reducing the value of the score Sc by a predetermined value is executed.

In FIG. 13, as shown in SS12, a penalty is given to the score Sc of the point D belonging to the same class as the point A, and the score Sc of the point D is reduced.

Here, a score changing process of, according to a label given by the label giving portion 54 to selected data selected based on predefined scores Sc given to a plurality of pieces of image data, changing the predefined score of data other than the selected data is executed.

In other words, the label giving portion 54 changes the predefined score Sc of data close to the image data to which the label is given in a predefined classification space.

According to the present modification, it is possible to, if there is imbalance in labeling by the user, prevent concentration of labeling to a particular identification boundary or a particular classification.

Modification 4

Though a penalty is given to a score Sc with the same label according to a label given by the user in the modification 3, the penalty may be given according to a distance to a position of image data to which a label is given in a classification space.

FIG. 14 is a diagram for illustrating giving of a penalty according to the present modification 4. FIG. 14 shows an example of a case of three classifications in a two-dimensional classification space similarly to FIG. 4.

In FIG. 14, when a label is given to a point P21, a penalty is given to the score Sc of a point P22 that is the closest to the point P21.

As a result, the probability of image data that is the closest to supervised data in the classification space being used as training data can be reduced.

Note that the penalty may be given not only to a point that is the closest to the supervised data but also to other close image data.

For example, in FIG. 14, a distance between a point P23 and the point P21 is L2; a distance between the point P22 and the point P21 is L1; L1<L2 is satisfied; and the point P23 is farther from the point P21 than the point P22 is. Each of the distances L1 and L2 is a distance from the position of the point P21 of the selected image data in the predefined classification space.

To such a plurality of points that are close to a point of image data for which instruction has been performed by the user, penalties corresponding to distances to the supervised data are given. As a result, a penalty smaller than a penalty to the point P22 is given to the point P23.

Note that the giving of penalties corresponding to distances may be executed for points within a predefined distance from supervised data. In other words, a penalty proportional to a distance may be given. A penalty proportional to a feature value vector difference may be given.

In other words, according to a predefined distance of selected data selected based on predefined scores Sc given to a plurality of pieces of image data in a predefined classification space, here, according to distances of data other than the selected data to the position of the selected data, the score changing portion 53 changes the predefined scores of the data other than the selected data.

Modification 5

Though the value of the score Sc indicates being closer to an identification boundary as the value is higher in the embodiment and each modification, such a value that indicates being closer to an identification boundary or the like as the value is smaller is also possible.

In that case, the label giving portion 54 displays pieces of image data on the display device 34a in order of scores Sc, and a penalty is given so that the value of the score Sc is increased.

Modification 6

Though the embodiment and each modification above have been described with a training apparatus for deep training using a neural network as an example, the embodiment and each modification are applicable to training apparatuses in other training methods such as an SVM (support vector machine), linear regression, Bayesian network, random forest, a k-means method and a genetic algorithm.

Modification 7

Though target data to be trained is image data in the embodiment and each modification described above, the embodiment and each modification described above are also applicable to other data such as acoustic data.

As described above, according to the embodiment and modifications described above, it is possible to provide a training apparatus and a training method for an inference system that shortens a time period required to update parameters of an inference model and prevents decrease in inference accuracy, and a program for the training method.

Note that, in the present embodiment and each modification, each portion of the training apparatus 6 may be configured as an individual electronic circuit or configured as a circuit block in an integrated circuit such as an FPGA (field programmable gate array). Further, in the present embodiment, for example, the training apparatus 6 may be configured being provided with two or more CPUs.

Furthermore, as for a program executing the operation described above, all or a part of the program is recorded or stored in a portable medium such as a flexible disk and a CD-ROM, or a storage medium such as a hard disk as a computer program product. By the program being read by a computer, all or a part of the operation is executed. All or a part of the program may be distributed or provided via a communication network. A user can easily realize a state monitoring system including the training apparatus of the present invention by downloading the program via a communication network and installing the program into a computer or by installing the program into the computer from a recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training apparatus for training an inference model performing a predetermined inference that infers, using the inference model, a class to which a state of a target belongs among a plurality of classes in a predefined classification space, the inference model being built using training data, the training apparatus comprising:
    a memory to store a plurality of pieces of data, and
    processing circuitry connected to the memory and configured to
        read the plurality of pieces of data;
        calculate a probability that the state of the target belongs to each class to which the state of the target belongs by executing the predetermined inference for the plurality of pieces of data;
        calculate, for each piece of data, a score corresponding to a difference in the probability with respect to each identification boundary for the plurality of classes, the score being a value corresponding to a closeness of a position of each piece of data in the predefined classification space to the identification boundary;

change the score of a piece of data other than a selected piece of data selected based on the scores among the plurality of pieces of data, such that a distance from an identification boundary identical to an identification boundary related to the selected piece of data becomes larger, according to a particular distance for the selected piece of data in the predefined classification space, give labels in the predefined classification space to pieces of data including the piece of data, the score of which is changed;

add, to the training data, the pieces of data to which the labels are given; and update the inference model using the training data to which the pieces of data, to which the labels are given, has been added.

2. The training apparatus according to claim 1, wherein the processing circuitry is further configured to add, to the training data, a piece of data, the predefined score of which is equal to or below a predetermined value.

3. The training apparatus according to claim 1, wherein the processing circuitry is further configured to output distribution display data to display a distribution of the scores on a display.

4. The training apparatus according to claim 1, wherein the training data used by the processing circuitry to update the inference model is data for deep training.

5. A training method for training, using a computer, an inference model performing a predetermined inference that infers, using the inference model, a class to which a state of a target belongs among a plurality of classes in a predefined classification space, the inference model being built using training data, the training method comprising:

reading a plurality of pieces of data from a memory storing the plurality of pieces of data;

calculating a probability that the state of the target belongs to each class to which the state of the target belongs by executing the predetermined inference for the plurality of pieces of data;

calculating, for each piece of data, a score corresponding to a difference in the probability with respect to each identification boundary for the plurality of classes, the score being a value corresponding to a closeness of a position of each piece of data in the predefined classification space to the identification boundary;

changing the score of a piece of data other than a selected piece of data selected based on the scores among the plurality of pieces of data, such that a distance from an identification boundary identical to an identification boundary related to the selected piece of data becomes larger, according to a particular distance for the selected piece of data in the predefined classification space;

giving labels in the predefined classification space to pieces of data including the piece of data the score of which is changed;

adding, to the training data, the pieces of data to which the labels are given; and updating the inference model using the training data to which the pieces of data, to which the labels are given, has been added.

6. A non-transitory computer-readable recording medium in which a program is recorded, the program being for training an inference model performing a predetermined inference that infers, using the inference model, a class to which a state of a target belongs among a plurality of classes in a predefined classification space, the inference model being built using training data, the program causing a computer to execute a method comprising:

reading a plurality of pieces of data from a memory storing the plurality of pieces of data;

calculating a probability that the state of the target belongs to each class to which the state of the target belongs by executing the predetermined inference for the plurality of pieces of data;

calculating, for each piece of data, a score corresponding to a difference in the probability with respect to each identification boundary for the plurality of classes, the score being a value corresponding to a closeness of a position of each piece of data in the predefined classification space to the identification boundary;

changing the score of a piece of data other than a selected piece of data selected based on the scores among the plurality of pieces of data, such that a distance from an identification boundary identical to an identification boundary related to the selected piece of data becomes larger, according to a particular distance for the selected piece of data in the predefined classification space;

giving labels in the predefined classification space to pieces of data including the piece of data the score of which is changed;

adding, to the training data, the pieces of data to which the labels are given; and updating the inference model using the training data to which the pieces of data, to which the labels are given, has been added.

* * * * *